(12) United States Patent
Gupta

(10) Patent No.: US 12,432,180 B2
(45) Date of Patent: Sep. 30, 2025

(54) SELECTIVE VIRTUAL PRIVATE NETWORK

(71) Applicant: ServiceNow, Inc., Santa Clara, CA (US)

(72) Inventor: Sagar Gupta, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 85 days.

(21) Appl. No.: 18/414,808

(22) Filed: Jan. 17, 2024

(65) Prior Publication Data
US 2025/0233849 A1 Jul. 17, 2025

(51) Int. Cl.
*G06F 13/00* (2006.01)
*H04L 9/40* (2022.01)
*H04L 67/56* (2022.01)

(52) U.S. Cl.
CPC .......... *H04L 63/0272* (2013.01); *H04L 67/56* (2022.05)

(58) Field of Classification Search
CPC .......................... H04L 63/0272; H04L 67/56
USPC ....... 709/239, 238, 225, 203, 202, 217–219; 718/104, 102, 100
See application file for complete search history.

(56) References Cited

U.S. PATENT DOCUMENTS

| | | | |
|---|---|---|---|
| 10,218,679 B1 | 2/2019 | Jawahar | |
| 10,374,953 B1* | 8/2019 | Branch | H04L 12/4633 |
| 10,778,582 B2* | 9/2020 | Branch | H04L 12/4633 |
| 11,316,787 B2* | 4/2022 | Branch | H04L 12/4641 |
| 11,563,685 B2* | 1/2023 | Branch | H04L 12/4641 |
| 11,805,021 B1* | 10/2023 | Bansal | H04L 41/5045 |
| 11,863,448 B2* | 1/2024 | Branch | H04L 12/4633 |
| 12,101,257 B2* | 9/2024 | Parla | H04L 67/141 |
| 2016/0366121 A1 | 12/2016 | Rykowski | |
| 2020/0236048 A1* | 7/2020 | Branch | H04L 12/4633 |
| 2021/0067445 A1* | 3/2021 | Branch | H04L 12/4633 |
| 2023/0275837 A1* | 8/2023 | Parla | H04L 63/0272 |
| | | | 370/230 |

* cited by examiner

*Primary Examiner* — Kenneth R Coulter
(74) *Attorney, Agent, or Firm* — McDonnell Boehnen Hulbert & Berghoff LLP (57) ABSTRACT

A connection request is received from a client to establish a first connection associated with a second connection of a virtual private network for selective network communications of a first group of one or more applications of the client. Network communications of a second group of one or more applications different from the first group of one or more applications of the client are to be routed outside the virtual private network. The second connection of the virtual private network is established between a proxy and a virtual private network server. The first connection is established between the proxy and the client. A network packet received from the client via the first connection is routed to the virtual private network server via the second connection of the virtual private network.

20 Claims, 6 Drawing Sheets

SELECTIVE VIRTUAL PRIVATE NETWORK

BACKGROUND OF THE INVENTION

A Virtual Private Network (VPN) allows a secure and encrypted connection over a network connection between a user device and a server and/or a protected network. This connection is often referred to as a "tunnel" because it creates a private and encrypted pathway for data to travel between the user device and the server and/or the protected network. Once the VPN is established, all network traffic of the user device is typically routed through the VPN to ensure privacy and security of all network traffic for the user device. Having all network of the user device routed through a slow VPN can lead to poor user experience for the user device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

On slow or limited bandwidth connections to the server, the performance of VPNs can be severely impacted. The conventional approach involves forwarding all network traffic through the VPN tunnel, which can lead to significant latency, packet loss, and reduced throughput. Even if the user device has high bandwidth access to other network resources that do not need to be protected by the VPN, having all network of the user device routed through a slow VPN tunnel leads to poor user experience for the user device. There is a need to balance security and privacy with performance and resource utilization.

In some embodiments, by selectively forwarding only certain network traffic through the VPN, overall data transmission performance is optimized while ensuring protection of the desired portion of the network traffic. However, selective forwarding may not be allowed by certain existing protocols (e.g., IPsec protocol) utilized to establish VPN connections with existing servers and network resources. In some embodiments, a proxy is utilized to enable VPN compatibility by allowing selective forwarding by the user device to the proxy and having the proxy handle compliance with the protocol for the VPN connection.

In some embodiments, a proxy receives a connection request from a client to establish a first connection associated with a second connection of a virtual private network for selective network communications of a first group of one or more applications of the client. Network communications of a second group of one or more applications of the client different from the first group of one or more applications of the client are to be routed outside the virtual private network. The second connection of the virtual private network is established between the proxy and a virtual private network server. The first connection between the proxy and the client is established. A network packet received from the client is routed via the first connection to the virtual private network server via the second connection of the virtual private network.

Figure 1:
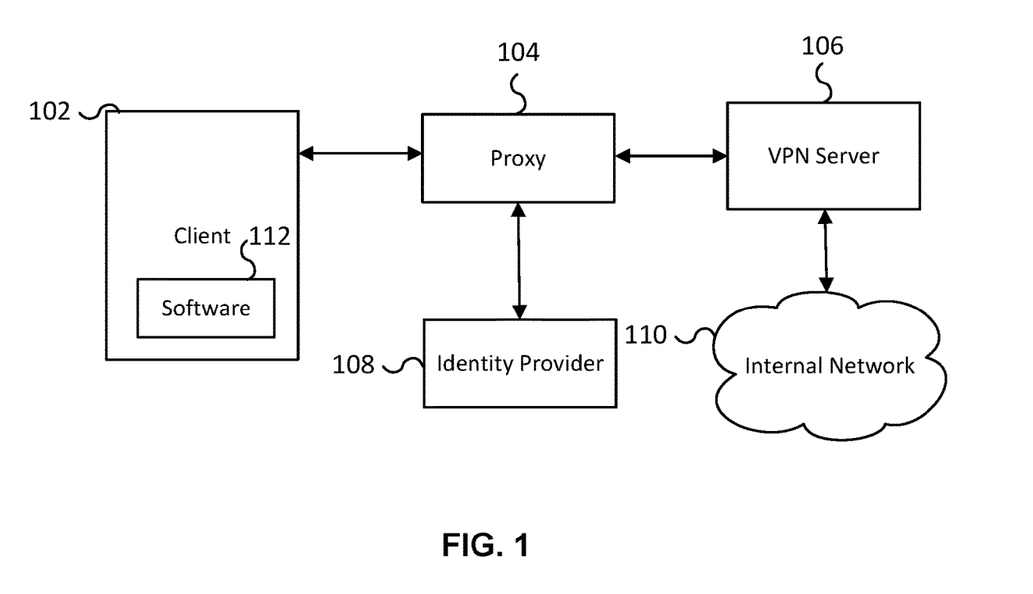
FIG. 1 is a block diagram illustrating an embodiment of a system environment for selectively handling VPN network traffic for a client.

FIG. 1 is a block diagram illustrating an embodiment of a system environment for selectively handling VPN network traffic for a client.

Client 102 includes VPN software 112. Examples of client 102 include a computer, a laptop, a desktop computer, a mobile device, or any other user device. VPN software 112 has been configured to selectively determine which network traffic is to be rerouted to proxy 104 for forwarding to VPN server 106 and which network traffic is allowed to be routed as normal without being rerouted to proxy 104. For example, one or more certain user applications are to be protected via a VPN and all network traffic for these certain application(s) are to be handled though the VPN. However, certain other applications do not need to be protected via the VPN and are allowed to communicate with the network as normal without being routed through the VPN. VPN software 112 is able to distinguish between communications of these different types of applications and is able to intercept and reroute network traffic accordingly. For example, VPN software 112 intercepts network communication for the certain one or more applications for forwarding to proxy 104 while allowing network communication for other applications to proceed as normal without being intercepted and rerouted through the VPN. In some embodiments, VPN software 112 receives data to be communicated and determines whether it should be rerouted to proxy 104 or be allowed to proceed as network communication without being forced to be rerouted/forwarded to proxy 104.

In some embodiments, VPN software 112 is a preconfigured application provided by proxy 104 or another entity external to the client. For example, an administrator configures VPN software 112 for a specific user and provides the configured software to client 102. The configuration may include an identification list of one or more applications to be routed/protected by the VPN (e.g., network traffic of the identified application(s) to be rerouted through proxy 104 for forwarding to the VPN) and/or an identification of a specific user account associated with VPN software 112. In some embodiments, an end user can specify or modify the specific list of one or more applications to be routed/protected by the VPN, while in other embodiments, the end user is unable to specify or modify the specific list of one or more applications to be routed/protected by the VPN.

When VPN software 112 is initiated, client 102 initiates a request for a connection with proxy 104 (e.g., a server, a virtual machine, a virtual container, etc.). For example, client 102 initiates a transport layer tunnel connection to an open access port of proxy 104. Proxy 104 verifies the user account associated with the request by using identity provider 108. Identity provider 108 may verify a credential (e.g., password, certificate, etc.) provided by client 102 to proxy 104. Identity provider 108 may use an identity database to verify this credential. Once the credential is verified, proxy 104 establishes a secure communication channel with client 102. Based on the request from client 102, proxy 104 identifies the appropriate VPN server for the request and establishes a secure communication channel (e.g., encrypted VPN transport layer tunnel) with VPN server 106. In some embodiments, this channel is a VPN connection tunnel to VPN server 106 authenticated using the credentials of the user of VPN software 112. For example, a credential of the user is provided by proxy 104 to VPN server 106 for verification. Once the secure connection with the VPN server 106 is established, access to internal network 110 is provided to client 102 via proxy 104 and VPN server 106. For any network communication to be sent to a network resource in internal network 110, client 102 can route/forward the network communication to proxy 104 forwarding to VPN server 106 and internal network 110. VPN server 106 can also forward a communication from a network resource in internal network 110 to proxy 104 for forwarding to client 102. For example, using the secure communication channels, proxy 104 forwards a network packet received from client 102 to VPN server 106 and forwards a network packet received from VPN server 106 to client 102. In some embodiments, proxy 104 handles communication for a plurality of different clients and/or a plurality of different VPN servers. For example, based on which client is providing a packet and/or a destination address of a packet, proxy 104 forwards the packet appropriately.

Due to legacy, protocol (e.g., IPsec protocol), and/or security requirements, VPN server 106 may require entire machine transport layer tunneling to establish a VPN connection with it. However, if client 102 directly establishes a transport layer tunneling with VPN server 106, it may be required to forward all network traffic to VPN server 106 rather than only for specific selected application network traffic as desired. By having proxy 104 establish the VPN connection instead of client 102, transport layer tunneling between proxy 104 and VPN server 106 can be established rather than requiring client 102 to directly establish transport layer tunneling with VPN server 106.

In various embodiment, the connections shown between the components of FIG. 1 are network connections (e.g., Internet, intranet, WAN, LAN, SAN, etc. connections). The example of FIG. 1 has been simplified, and in various embodiments, other intermediary network components not shown may exist in between the shown connections.

Figure 2:
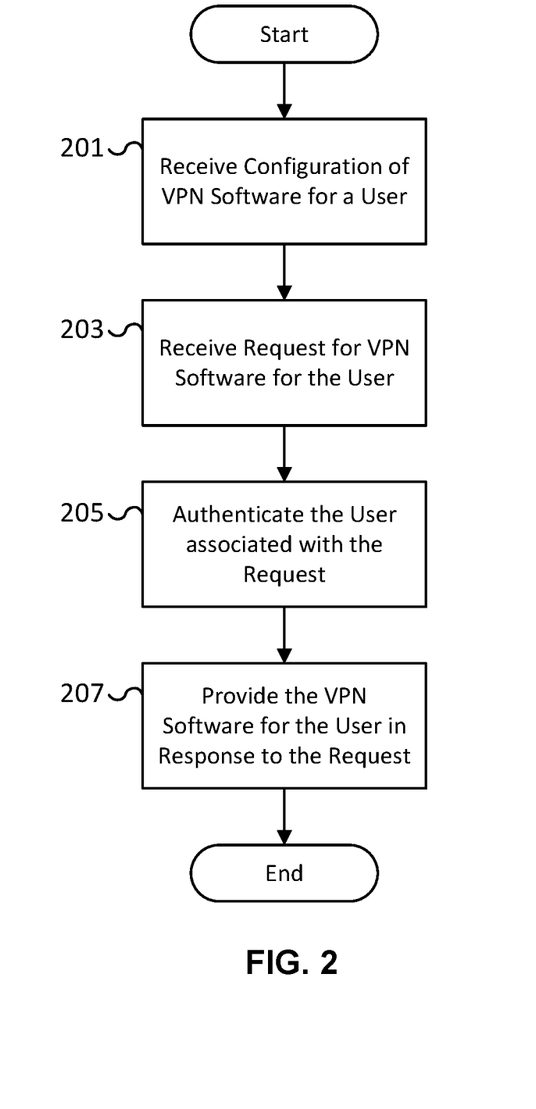
FIG. 2 is a flow diagram illustrating an embodiment of a process for configuring VPN software.

FIG. 2 is a flow diagram illustrating an embodiment of a process for configuring VPN software. In some embodiments, at least a portion of the process of FIG. 2 is implemented on proxy 104 of FIG. 1.

At 201, a configuration of a VPN software for a user is received. For example, configuration for VPN software 112 of FIG. 1 is received. In some embodiments, the VPN software is preconfigured by an administrator for the specific user or a group of users. The configuration may include an identification list of a group of one or more applications to be routed/protected by a VPN (e.g., network traffic of identified application(s) to be rerouted to proxy 104 of FIG. 1). The configuration may include an identification of a specific user account or a group of user accounts associated with VPN software. One or more other applications not identified in the configuration and/or identified in a different group are to be handled as normal by not rerouting/protecting its network traffic by the VPN (e.g., network traffic of these application(s) to be not rerouted to proxy 104 of FIG. 1). In some embodiments, an end user of the VPN software can specify or modify the configuration, while in other embodiments, the end user is unable to specify or modify the configuration.

In some embodiments, the VPN software has been configured to manage which network traffic is to be rerouted to proxy 104 for forwarding to VPN server 106 and which network traffic is allowed to be routed as normal without being rerouted to proxy 104. For example, a first group of one or more certain user applications is to be protected via a VPN and all network traffic for these certain application(s) are to be handled though the VPN. However, certain other applications of a second group do not need to be protected via the VPN and are allowed to communicate with the network as normal without being rerouted through the VPN. The second group of one or more applications is different from the first group of one or more applications. The VPN software can distinguish between communications of these different types of applications and is able to handle network traffic accordingly. In some embodiments, the VPN software intercepts network communication for certain one or more applications for rerouting to proxy 104 for VPN protection while allowing network communication for other applications to bypass the VPN without being intercepted and rerouted to the proxy. For example, the VPN software receives data to be communicated via a network and determines whether it should be rerouted to proxy 104 or be allowed to proceed as normal without being rerouted to proxy 104.

At 203, a request for the VPN software for the user is received. For example, client 102 sends a request for the VPN software to a server (e.g., proxy server 104 of FIG. 1).

At 205, the user associated with the request for the VPN software is authenticated. For example, because the VPN software has been configured specifically for the user, the VPN software is to be only provided to a device/system of the user. The request for the VPN software includes a credential (e.g., username/password, certificate, etc.) of the user, and the credential is authenticated to ensure the request is authorized by the user. In some embodiments, a server (e.g., proxy server 104 of FIG. 1) can authenticate the user using an identity provider (e.g., identity provider 108 of FIG. 1).

At 207, the requested VPN software is provided in response to the request.

Figure 3:
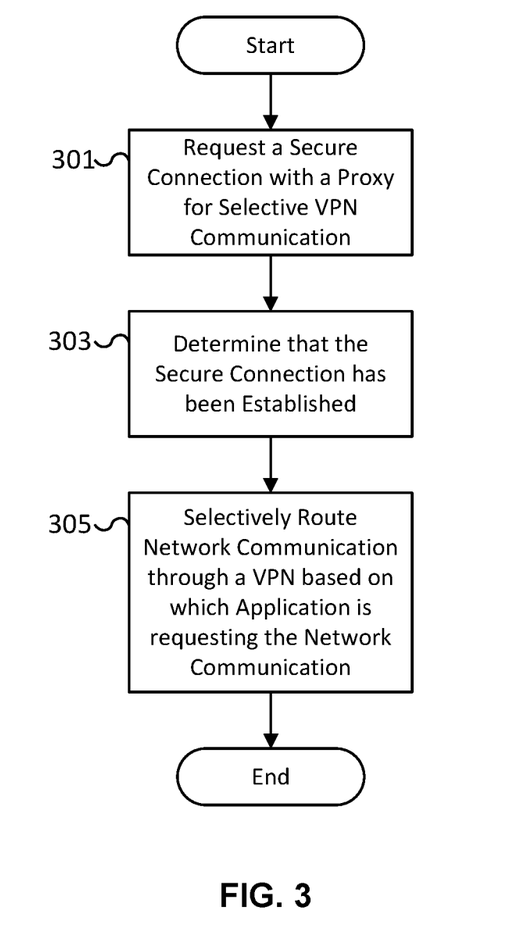
FIG. 3 is a flow diagram illustrating an embodiment of a process for requesting a secure connection for selective VPN communication.

FIG. 3 is a flow diagram illustrating an embodiment of a process for requesting a secure connection for selective VPN communication. In some embodiments, at least a portion of the process of FIG. 3 is implemented on client 102 of FIG. 1. For example, VPN software 112 of FIG. 1 is used to implement at least a portion of the process of FIG. 3.

At 301, a secure connection with a proxy is requested for selective VPN communication. For example, when VPN software 112 of FIG. 1 is initiated, client 102 initiates a request for a connection with the proxy for selective use for network traffic to be routed through a VPN. In some embodiments, the secure connection is made to an open access port of the proxy.

At 303, it is determined that the secure connection has been established. For example, the proxy has validated the request (e.g., validated a user credential provided with the request in 301), and a secure communication channel has been established between the client and the proxy.

At 305, network communication is selectively routed through a VPN based on which application is requesting the network communication. For example, network communication is analyzed to selectively determine whether it is to be rerouted to the proxy for VPN handling or whether it is to be routed as normal without being routed to the proxy for VPN handling. One or more certain user applications are to be protected via the VPN and all network traffic for these certain application(s) are to be handled though the VPN. However, certain other applications do not need to be protected via the VPN and are allowed to communicate with the network as normal without the VPN. In some embodiments, the VPN software can distinguish between communications of these different types of applications and is able to handle network traffic accordingly. In some embodiments, the VPN software intercepts network communication for certain one or more applications for rerouting to proxy 104 while allowing network communication for other applications to proceed as normal without being intercepted for rerouting to the VPN via the proxy. For example, the VPN software receives data to be communicated and determines whether it should be rerouted to proxy 104 or be allowed to proceed as normal without being rerouted to proxy 104.

Figure 4:
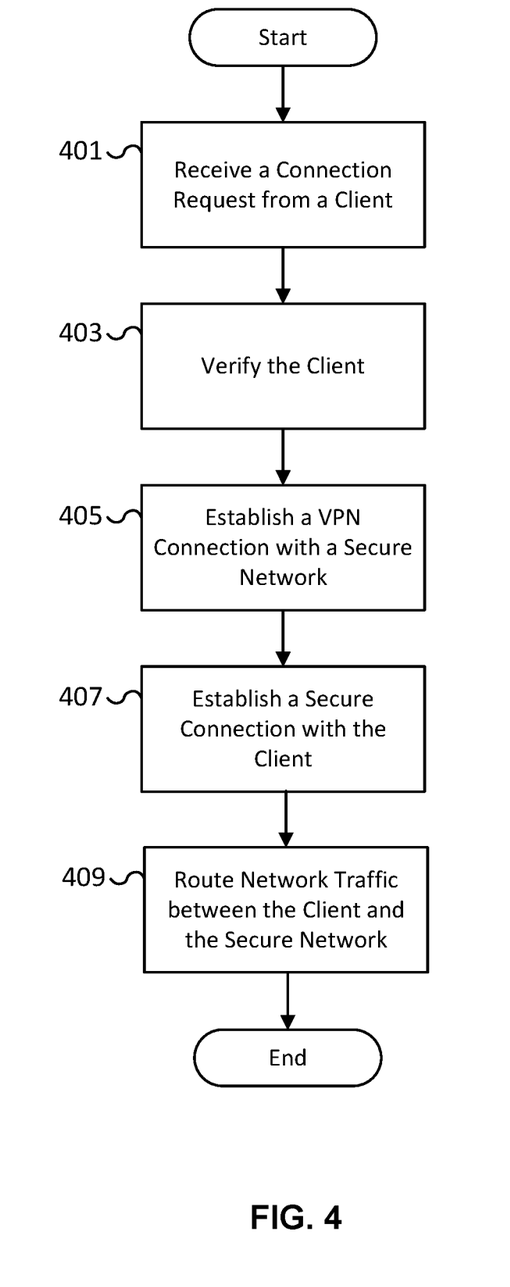
FIG. 4 is a flow diagram illustrating an embodiment of a process for establishing a secure connection for selective VPN communication.

FIG. 4 is a flow diagram illustrating an embodiment of a process for establishing a secure connection for selective VPN communication. In some embodiments, at least a portion of the process of FIG. 4 is implemented on proxy 104 of FIG. 1.

At 401, a connection request is received from a client. In some embodiments, the request is the request requested in 301 of FIG. 3.

At 403, the client is verified. For example, a user account or credential indicated in the connection request is verified via an identity provider (e.g., identity provider 108 of FIG. 1). The identity provider may use an identity database to verify username/password and/or a security certificate of the user account/credential.

At 405, a VPN connection with a secure network is established. In some embodiments, establishing the VPN connection includes identifying a VPN server, network, or resource associated with the connection request of 401. For example, the request in 401 includes an identifier (e.g., user identifier, resource identifier, etc.) that can be used to determine the VPN server or resource requested to be connected. In some embodiments, a secure encrypted connection/tunnel at the transport layer is established between the proxy and the identified VPN server. In some embodiments, the VPN connection conforms to the IPsec protocol.

At 407, a secure connection is established with the client. In some embodiments, the established connection is the connection established in 303 of FIG. 3. For example, a secure communication channel is established between the proxy and the client in response to the connection request in 401.

At 409, network traffic is routed between the client and the secure network. For example, access to internal network 110 of FIG. 1 is provided to client 102 via proxy 104 and VPN server 106. For any network communication to be handled using internal network 110, client 102 can reroute the network communication to proxy 104 for forwarding to VPN server 106, and VPN server 106 can forward communication from internal network 110 to proxy 104 for forwarding to client 102. For example, proxy 104 forwards a network packet received from client 102 to VPN server 106 and forwards a network packet received from VPN server 106 to client 102.

Figure 5:
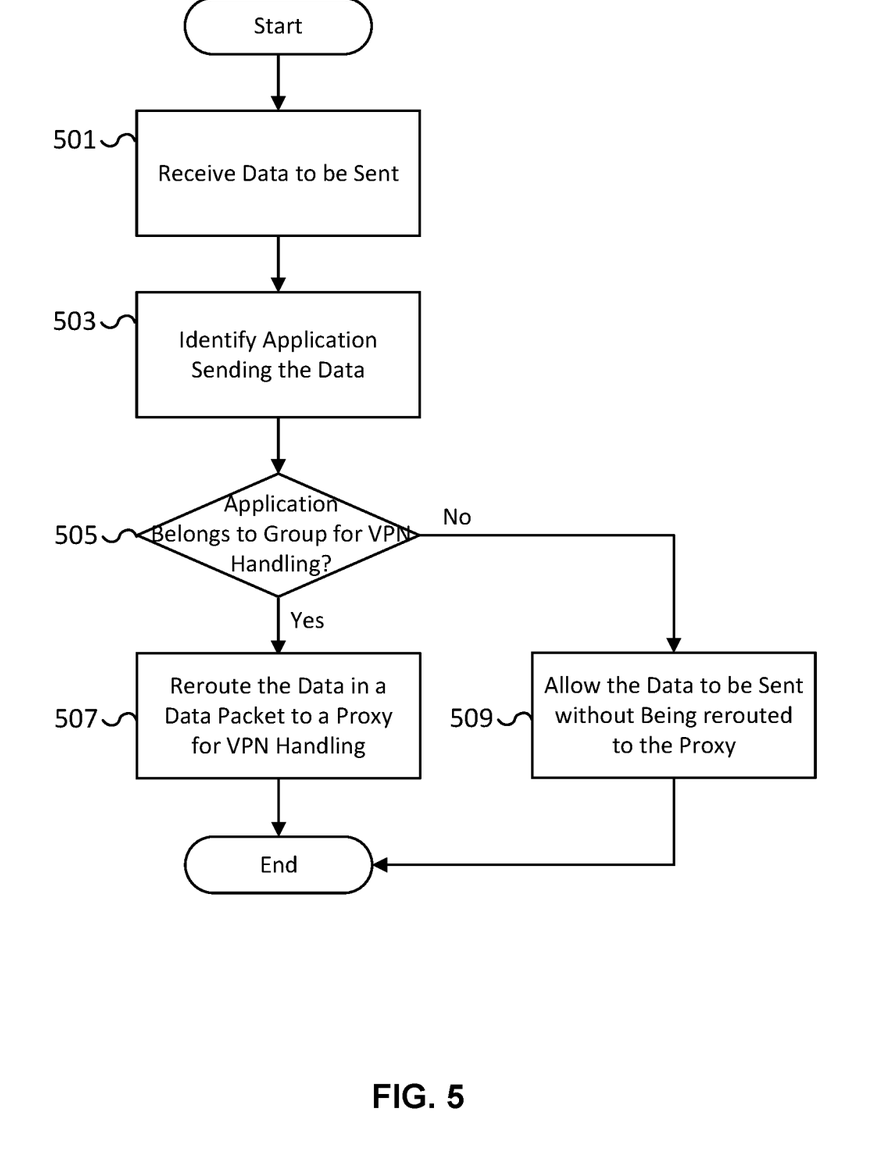
FIG. 5 is a flow diagram illustrating an embodiment of a process for handling data to be selectively routed through a VPN.

FIG. 5 is a flow diagram illustrating an embodiment of a process for handling data to be selectively routed through a VPN. In some embodiments, at least a portion of the process of FIG. 5 is implemented on client 102 of FIG. 1. For example, VPN software 112 of FIG. 1 implements at least a portion of the process of FIG. 5. In some embodiments, at least a portion of the process of FIG. 5 is included in 305 of FIG. 3.

At 501, data to be sent via a network is received. For example, the data is from an application executing on a client and is received or intercepted at VPN software 112 of FIG. 1.

At 503, the application sending the data is identified. A group of one or more certain user applications are to be protected via a VPN and all network traffic for these certain application(s) are to be handled though the VPN. However, certain other applications (e.g., belong a different second group) do not need to be protected via the VPN and are allowed to communicate via the network as normal without the VPN.

At 505, it is determined whether the identified application belongs to an application group to be protected by the VPN. For example, network data for any application belonging to a first group of one or more applications is to be routed to a proxy for VPN handling while any other application not belonging to the group or belonging to a second different group is to be routed as normal outside the VPN.

If at 505 it is determined that the identified application belongs to the group for VPN handling, at 507, the data is rerouted in a data packet to a proxy for VPN handling. For example, the sent data packet is received at 409 of FIG. 4 and proxy 104 forwards the data to VPN server 106 of FIG. 1 for routing by a secure VPN network.

If at 505 it is determined that the identified application does not belong to the group for VPN handling (e.g., doesn't belong to any group or belongs to a different second group), at 509 the data is allowed to be sent without being rerouted to the proxy (e.g., proxy 104 of FIG. 1). For example, the data is sent in a data packet to a specified network destination without being rerouted through a VPN via the proxy.

Figure 6:
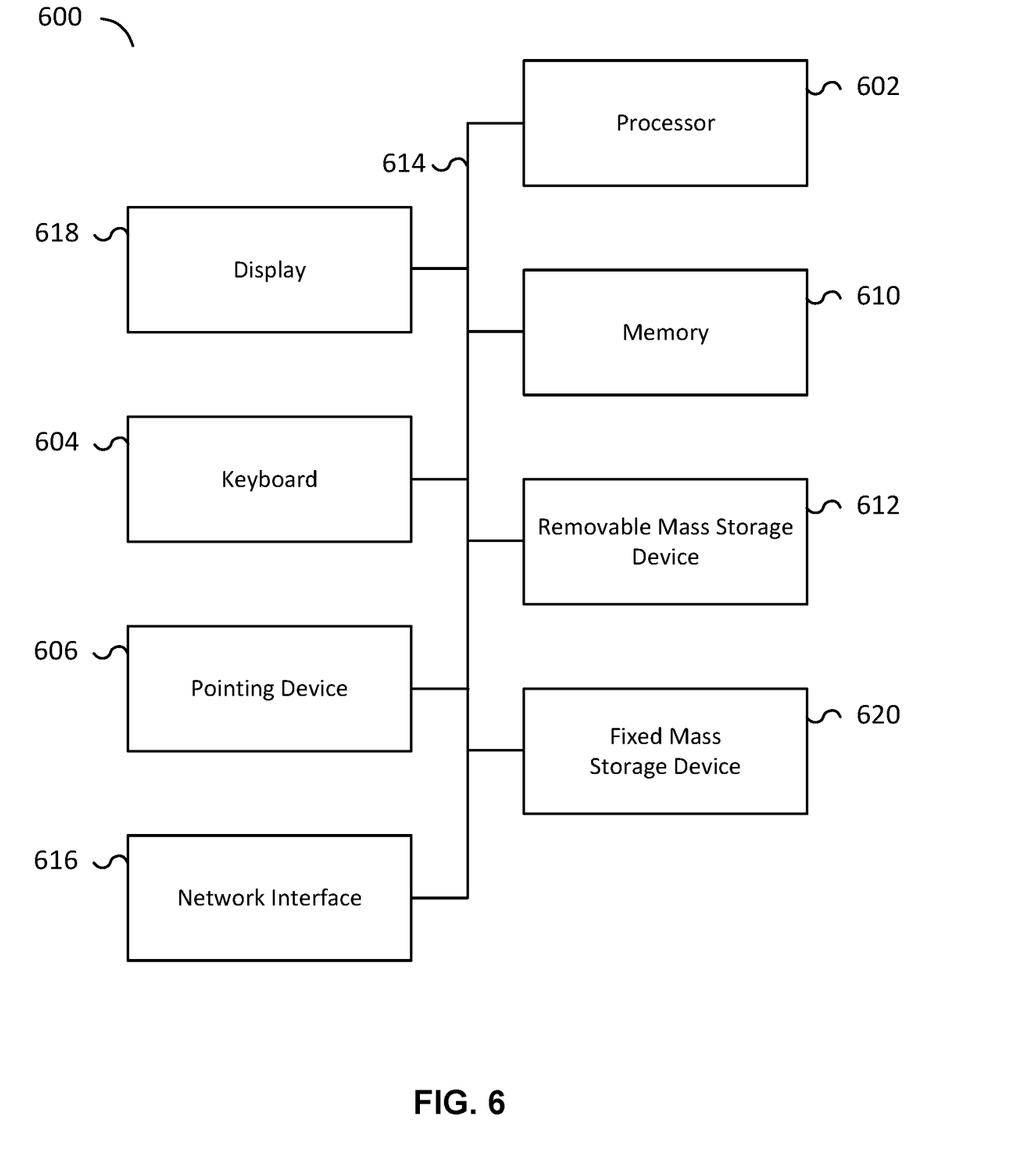
FIG. 6 is a functional diagram illustrating a programmed computer system.

FIG. 6 is a functional diagram illustrating a programmed computer system. Examples of computer system 600 include any component shown in FIG. 1. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In various embodiments, one or more instances of computer system 600 can be used to implement at least portions of the processes of FIGS. 2-5.

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data and objects used by the processor 602 to perform its functions (e.g., programmed instructions). For example, memory 610 can include any suitable computer-readable storage media, described below, depending on whether, for example, data access needs to be bi-directional or unidirectional. For example, processor 602 can also directly and very rapidly retrieve and store frequently needed data in a cache memory (not shown).

A removable mass storage device 612 provides additional data storage capacity for the computer system 600, and is coupled either bi-directionally (read/write) or unidirectionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storages 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
  receiving, from a client, a connection request to establish a first connection associated with a second connection of a virtual private network for selective network communications of a first group of one or more applications of the client, wherein network communications of a second group of one or more applications different from the first group of one or more applications of the client are to be routed outside the virtual private network;
  establishing the second connection of the virtual private network between a proxy and a virtual private network server;
  establishing the first connection between the proxy and the client; and routing a network packet received from the client via the first connection to the virtual private network server via the second connection of the virtual private network.

2. The method of claim 1, wherein the connection request is initiated by a virtual private network application executed by the client.

3. The method of claim 2, wherein the virtual private network application is provided by the proxy.

4. The method of claim 3, wherein the virtual private network application has been configured specifically for the client prior to being provided by the proxy.

5. The method of claim 1, wherein a configuration of which one or more applications are included in the first group is modifiable.

6. The method of claim 1, wherein the selective network communications of the first group have been intercepted at the client and rerouted to the proxy.

7. The method of claim 1, wherein the network communications of the second group are selectively not intercepted and not rerouted to the proxy.

8. The method of claim 1, further comprising verifying the client.

9. The method of claim 1, wherein establishing the second connection includes establishing a transport layer tunnel.

10. The method of claim 1, wherein establishing the first connection between the proxy and the client includes using an open access port of the proxy.

11. A system comprising:
a communication interface configured to receive from a client, a connection request to establish a first connection associated with a second connection of a virtual private network for selective network communications of a first group of one or more applications of the client, wherein network communications of a second group of one or more applications different from the first group of one or more applications of the client are to be routed outside the virtual private network; and
one or more processors configured to:
establish the second connection of the virtual private network between a proxy and a virtual private network server;
establish the first connection between the proxy and the client; and
route a network packet received from the client via the first connection to the virtual private network server via the second connection of the virtual private network.

12. The system of claim 11, wherein the connection request is initiated by a virtual private network application executed by the client.

13. The system of claim 11, wherein a configuration of which one or more applications are included in the first group is modifiable.

14. The system of claim 11, wherein establishing the second connection includes establishing a transport layer tunnel.

15. The system of claim 11, wherein establishing the first connection between the proxy and the client includes using an open access port of the proxy.

16. A method comprising:
requesting to a proxy a first connection associated with a second connection of a virtual private network for selective network communications of a first group of one or more applications, wherein network communications of a second group of one or more applications different from the first group of one or more applications are to be routed outside the virtual private network;
determining that the first connection has been established;
receiving a request to send data from a specific application belonging to the first group; and
in response to determining that the data from the specific application belongs to the first group, sending the data in a data packet to the proxy for forwarding to the second connection of the virtual private network.

17. The method of claim 16, wherein determining that the data from the specific application belongs to the first group includes intercepting the data.

18. The method of claim 16, further comprising in response to determining that a second data is from a different specific application included in the second group, determining not to intercept the second data and allowing the second data to be sent without being rerouted to the proxy.

19. The method of claim 16, wherein the second connection is established using a transport layer tunnel.

20. The method of claim 16, wherein the first connection is established using an open access port of the proxy.

* * * * *